United States Patent
Chao et al.

(10) Patent No.: US 10,679,081 B2
(45) Date of Patent: Jun. 9, 2020

(54) BIOMETRIC DEVICE AND WEARABLE CARRIER

(71) Applicant: Industrial Technology Research Institute, Hsinchu (TW)

(72) Inventors: Chia-Hsin Chao, Hsinchu County (TW); Yen-Hsiang Fang, New Taipei (TW); Ming-Hsien Wu, Tainan (TW); Po-Hsun Wang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 183 days.

(21) Appl. No.: 15/730,687

(22) Filed: Oct. 11, 2017

(65) Prior Publication Data

US 2018/0032826 A1 Feb. 1, 2018

Related U.S. Application Data

(63) Continuation-in-part of application No. 15/221,615, filed on Jul. 28, 2016, now abandoned.

(60) Provisional application No. 62/198,645, filed on Jul. 29, 2015.

(30) Foreign Application Priority Data

Jun. 30, 2016 (TW) .............................. 105120683 A

(51) Int. Cl.
| | |
|---|---|
| *G06K 9/00* | (2006.01) |
| *H04N 5/33* | (2006.01) |
| *G06K 9/20* | (2006.01) |
| *H04N 5/225* | (2006.01) |

(52) U.S. Cl.
CPC ......... *G06K 9/00885* (2013.01); *G06K 9/209* (2013.01); *G06K 9/2018* (2013.01); *H04N 5/33* (2013.01); *G06K 2009/00932* (2013.01); *H04N 5/2256* (2013.01)

(58) Field of Classification Search
CPC ..... G06K 2009/00932; G06K 9/00885; H04N 5/2256; H04N 5/33
See application file for complete search history.

(56) References Cited

U.S. PATENT DOCUMENTS

| | | | |
|---|---|---|---|
| 6,580,078 B1 * | 6/2003 | O'Callaghan | G02F 1/141 250/221 |
| 7,705,835 B2 * | 4/2010 | Eikman | G06F 3/0425 178/18.01 |
| 7,876,929 B2 * | 1/2011 | Matsumura | G06K 9/00 382/115 |

(Continued)

FOREIGN PATENT DOCUMENTS

| | | |
|---|---|---|
| CN | 203552271 | 4/2014 |
| TW | M319480 | 9/2007 |

(Continued)

*Primary Examiner* — Shaghayegh Azima
(74) *Attorney, Agent, or Firm* — JCIPRNET

(57) ABSTRACT

A biometric device includes a substrate, an image sensor, at least one infrared light emitting diode (IR LED), a supporting structure and an optical layer. The image sensor is disposed on the substrate. The at least one IR LED is disposed on the substrate. The supporting structure is disposed on the substrate and located between the image sensor and the at least one infrared light emitting diode. The optical layer is disposed on the supporting structure, covers the image sensor, and includes a coded pattern.

13 Claims, 5 Drawing Sheets

(56) References Cited

U.S. PATENT DOCUMENTS

| | | | |
|---|---|---|---|
| 9,100,493 B1* | 8/2015 | Zhou | H04M 1/72522 |
| 2004/0184732 A1* | 9/2004 | Zhou | G01J 3/02 |
| | | | 385/37 |
| 2007/0040062 A1* | 2/2007 | Lau | F41G 3/147 |
| | | | 244/3.16 |
| 2007/0201738 A1* | 8/2007 | Toda | H04N 9/045 |
| | | | 382/144 |
| 2007/0206908 A1* | 9/2007 | Cohen | B29D 11/0075 |
| | | | 385/92 |
| 2008/0107309 A1 | 5/2008 | Cerni | |
| 2008/0232653 A1* | 9/2008 | Rowe | A61B 5/6826 |
| | | | 382/124 |
| 2009/0169071 A1* | 7/2009 | Bond | A61B 5/1172 |
| | | | 382/124 |
| 2010/0067757 A1* | 3/2010 | Arai | G06K 9/0004 |
| | | | 382/128 |
| 2010/0208949 A1* | 8/2010 | Sato | G06K 9/00885 |
| | | | 382/115 |
| 2010/0280504 A1* | 11/2010 | Manzke | A61B 5/0084 |
| | | | 606/11 |
| 2012/0225514 A1* | 9/2012 | Wada | H01L 27/14618 |
| | | | 438/65 |
| 2013/0064514 A1* | 3/2013 | Peng | G11B 5/3133 |
| | | | 385/124 |
| 2013/0136317 A1* | 5/2013 | Shinzaki | G06F 21/32 |
| | | | 382/115 |
| 2013/0265568 A1* | 10/2013 | Micheels | G01N 21/3563 |
| | | | 356/51 |
| 2014/0091328 A1* | 4/2014 | Ishiguro | A61B 5/1455 |
| | | | 257/84 |
| 2014/0185885 A1* | 7/2014 | Yamada | G06K 9/00892 |
| | | | 382/124 |
| 2014/0196131 A1 | 7/2014 | Lee | |
| 2014/0218327 A1* | 8/2014 | Shi | G06F 3/041 |
| | | | 345/174 |
| 2015/0036065 A1* | 2/2015 | Yousefpor | G06K 9/228 |
| | | | 349/12 |
| 2015/0069454 A1* | 3/2015 | Park | H01L 33/62 |
| | | | 257/99 |
| 2015/0235227 A1 | 8/2015 | Lee et al. | |
| 2015/0269406 A1* | 9/2015 | Hama | G06K 9/00221 |
| | | | 382/124 |
| 2015/0270429 A1* | 9/2015 | Jiroku | H01L 31/105 |
| | | | 257/458 |
| 2015/0292884 A1* | 10/2015 | Fuchikami | H04N 5/232 |
| | | | 348/135 |
| 2015/0363629 A1* | 12/2015 | Lee | G06K 9/0002 |
| | | | 345/173 |
| 2016/0041663 A1* | 2/2016 | Chen | G06F 3/0412 |
| | | | 345/174 |
| 2016/0088203 A1* | 3/2016 | Maeda | G06K 9/00013 |
| | | | 382/115 |
| 2016/0282584 A1* | 9/2016 | Cui | G02B 9/16 |
| 2016/0328595 A1* | 11/2016 | Sun | H01L 27/14629 |
| 2017/0193295 A1* | 7/2017 | Kim | G06K 9/00885 |
| 2017/0371213 A1* | 12/2017 | Wang | G06F 3/044 |
| 2019/0102595 A1* | 4/2019 | Lee | G06F 3/0412 |

FOREIGN PATENT DOCUMENTS

| | | |
|---|---|---|
| TW | I485629 | 5/2015 |
| TW | I550524 | 9/2016 |

\* cited by examiner

BIOMETRIC DEVICE AND WEARABLE CARRIER

CROSS-REFERENCE TO RELATED APPLICATION

This application is a continuation-in-part application of and claims the priority benefit of a prior U.S. application Ser. No. 15/221,615, filed on Jul. 28, 2016, now pending. The prior U.S. application Ser. No. 15/221,615 claims the priority benefits of U.S. provisional application Ser. No. 62/198,645, filed on Jul. 29, 2015 and Taiwan application serial no. 105120683, filed on Jun. 30, 2016. The entirety of each of the above-mentioned patent applications is hereby incorporated by reference herein and made a part of this specification.

BACKGROUND OF THE DISCLOSURE

Field of the Disclosure

The disclosure relates to a recognition device, and particularly relates to a biometric device and a wearable carrier using the biometric device.

Description of Related Art

Biometrics plays a more and more important role in today's society, where types of the biometrics mainly include face recognition, iris recognition, vein recognition, fingerprint recognition, etc.

In terms of a current technique, solution for identity (ID) recognition on a smart wearable device is still not developed, and a reason thereof is that the wearable device generally requires a light and thin ID recognition system, and sensing light emitted by the infrared light emitting diode thereof needs to be prevented from being directly transferred to the image sensor thereof, which lowers accuracy of the sensing. Therefore, how to design a biometric device with thinned modules and prevent sensing light from being directly transferred to the image sensor has become an important technical challenge in design of the biometric device.

SUMMARY OF THE DISCLOSURE

The disclosure is directed to a biometric device, which adopts an optical layer to achieve a thinning effect, and can prevent sensing light from being directly transferred to an image sensor thereof.

The disclosure is directed to a wearable carrier, which has the aforementioned biometric device.

The disclosure provides a biometric device, which is adapted to recognize a biological characteristic of a region of a biological body. The biometric device includes a substrate, an image sensor, at least one infrared light emitting diode (IR LED), a supporting structure and an optical layer. The image sensor is disposed on the substrate. The at least one IR LED is disposed on the substrate. The supporting structure is disposed on the substrate and located between the image sensor and the at least one infrared light emitting diode. The optical layer is disposed on the supporting structure, covers the image sensor, and includes a coded pattern.

The disclosure provides a wearable carrier, which is adapted to be worn on a user. The wearable carrier includes a display unit, a strip unit and a biometric device. The strip unit is connected to the display unit at a first edge and a second edge opposite to each other. The biometric device is disposed on the display unit or the strip unit for recognizing a biological characteristic of a region of a biological body. The biometric device includes a substrate, an image sensor, at least one IR LED, a supporting structure and an optical layer. The image sensor is disposed on the substrate. The at least one IR LED is disposed on the substrate. The supporting structure is disposed on the substrate and located between the image sensor and the at least one infrared light emitting diode. The optical layer is disposed on the supporting structure, covers the image sensor, and includes a coded pattern.

According to the above description, since the biometric device of an embodiment of the disclosure adopts the design of the optical layer to replace the conventional optical module with a large volume, the biometric device of the disclosure has an advantage of thinning tendency. Moreover, the supporting structure disposed between the IR LED and the image sensor can prevent sensing light emitted by the IR LED from being directly transferred to the image sensor, so as to maintain accuracy of the sensing.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1A:
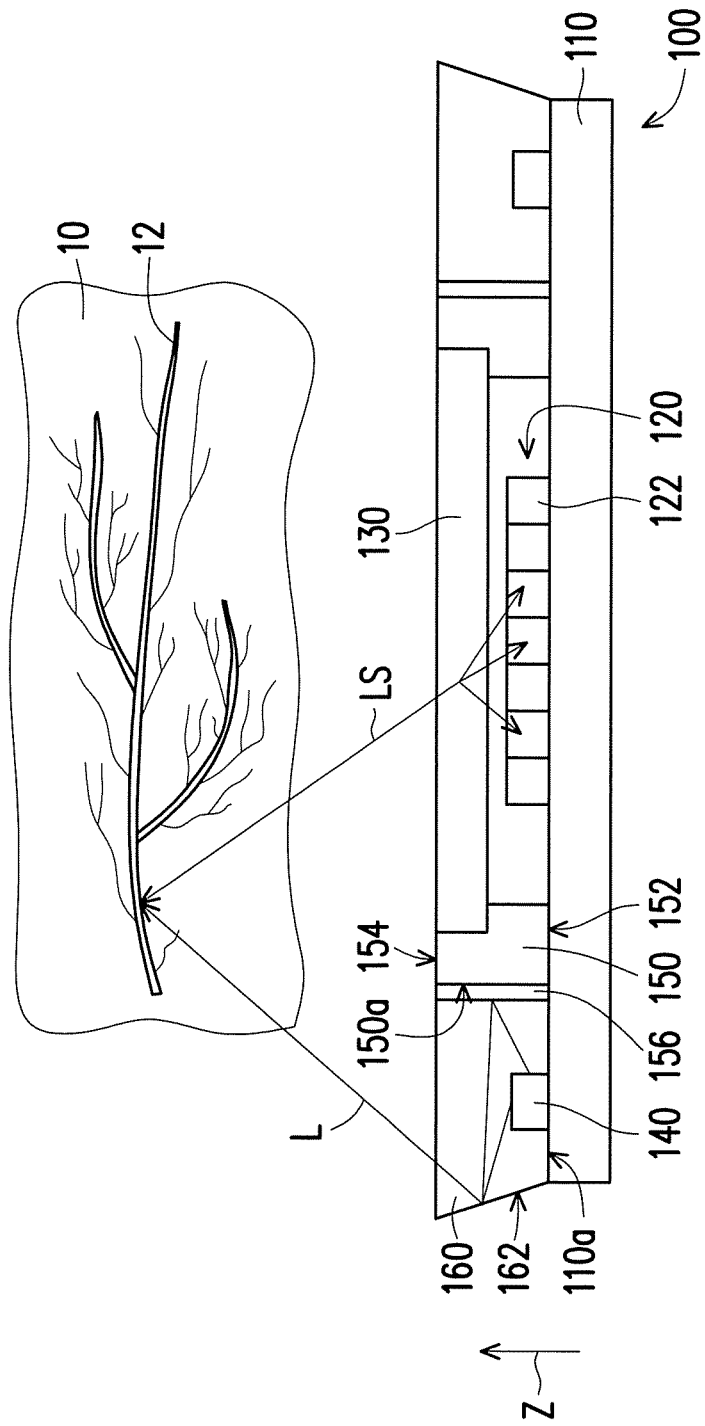
FIG. 1A is a cross-sectional view of a biometric device according to an embodiment of the disclosure.
Figure 1B:
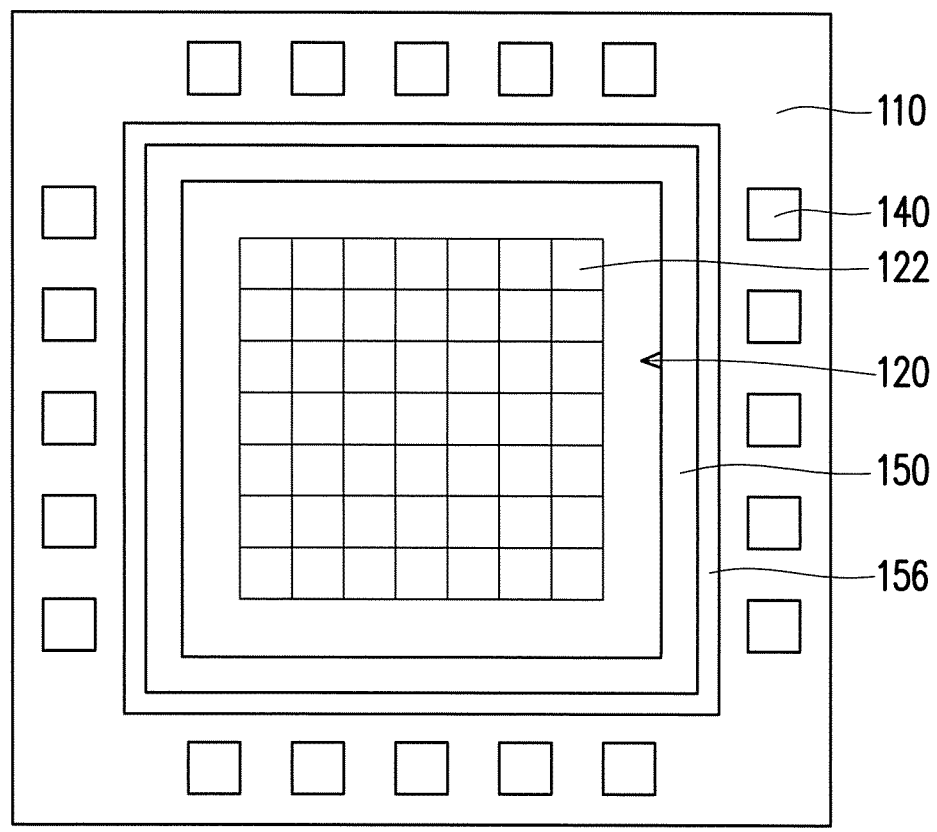
FIG. 1B is a top view of partial components of the biometric device of FIG. 1A.
Figure 1C:
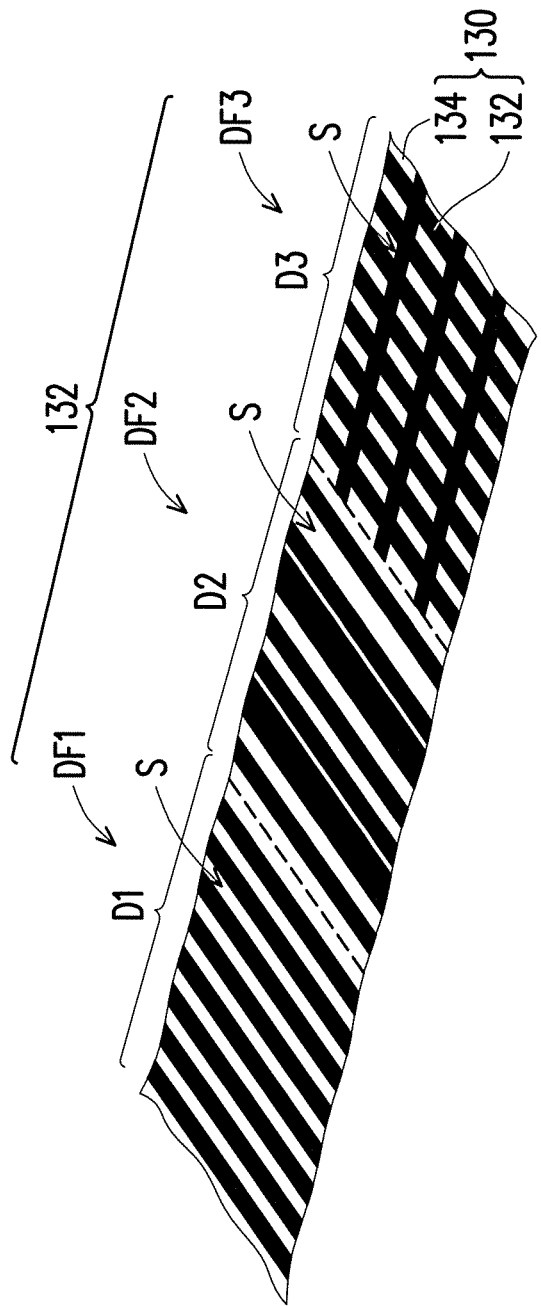
FIG. 1C illustrates partial area of the optical layer of FIG. 1A.
Figures 2A, 2B, 2C, 2D, 2E:
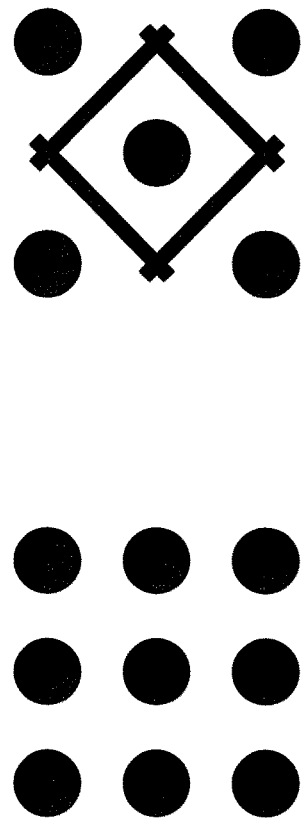
FIGS. 2A-2E are schematic diagrams of coded figures of a plurality of different embodiments in the optical layer.

FIG. 1A is a cross-sectional view of a biometric device according to an embodiment of the disclosure. FIG. 1B is a top view of partial components of the biometric device of FIG. 1A. FIG. 1C illustrates partial area of the optical layer of FIG. 1A. Referring to FIG. 1A, FIG. 1B and FIG. 1C, in the present embodiment, the biometric device 100 is adapted to recognize a biological characteristic of a region 12 of a biological body 10, where the region 12 of the biological body 10 is, for example, a wrist of a human body, and the biological characteristic is, for example, a vein network image characteristic. The biometric device 100 includes a substrate 110, an image sensor 120, an optical layer 130, at least one infrared light emitting diode (IR LED) 140 (in FIG. 1A and FIG. 1B, a plurality of IR LEDs is schematically illustrated) and a supporting structure 150. The image sensor 120, the IR LEDs 140 and the supporting structure 150 are disposed on the substrate 110. The supporting structure 150 is located between the image sensor 120 and the IR LEDs 140. The supporting structure 150 surrounds the image sensor 120, and the IR LEDs 140 surround the supporting structure 150. The optical layer 130 is disposed on the supporting structure 150, covers the image sensor 120, and includes a coded pattern 132.

In detail, the image sensor 120 includes a plurality of photosensing units 122, where the photosensing units 122 are arranged in an array. The optical layer 130 further includes a transparent substrate 134, and the coded pattern 132 is disposed on the transparent substrate 134 to define a plurality of slits S. As shown in FIG. 1C, the transparent substrate 134 of the optical layer 130 of the present embodiment can be divided into a plurality of blocks, for example, blocks D1, D2, D3, and each block D1 (or the block D2, the block D3) is configured with a coded figure DF1 (or a coded figure DF2, a coded figure DF3), and the coded figures DF1, DF2, DF3 define the coded pattern 132. The coded figure DF1 in the block D1, for example, comprises a plurality of line images of the same size, and the coded figure DF2 in the block D2, for example, comprises a plurality of line images with different widths, and the coded figure DF3 in the block D3, for example, comprises a plurality of line images of the same size, and the line images are intersected with each other to form a grid, though the disclosure is not limited thereto. For example, the shape of the coded figure can be any shape of coded figures DF4-DF8 shown in FIG. 2A-FIG. 2E or other shapes, which is not limited by the disclosure. It should be noted that the transparent substrate 134 of the optical layer 130 can be divided into the required number of blocks according to an actual requirement, and these blocks can be respectively configured with the required coded figure to define the coded pattern 132 of different types. Since the coded pattern 132 is an opaque pattern and is disposed on the transparent substrate 134, the slits S are defined on the transparent substrate 134 (i.e. the region without the coded pattern 132).

A sensing light L emitted by the IR LEDs 140 is incident to the region 12 of the biological body 10, and is scattered by the region 12 of the biological body 10 to form a scattered light LS, and the scattered light LS enters the optical layer 130. Then, the scattered light LS passes through the slits S to produce a projected shadow of the coded pattern 132 or a diffraction effect for imaging, and the image sensor 120 receives the scattered light LS, and obtains a recognition result after image processing and image analysis and comparison.

Since the optical layer 130 of the present embodiment is embodied as a single layer type optical layer, compared to the conventional optical module consisting of multilayer of lenses, the optical layer 130 of the present embodiment may have a thinner volume. Therefore, the biometric device 100 of the present embodiment adopts the optical layer 130 to replace the conventional large-volume optical modules, by which the whole volume and thickness can be greatly decreased to cope with a thinning tendency. Moreover, the supporting structure 150 disposed between the IR LEDs 140 and the image sensor 120 can prevent sensing light L emitted by the IR LEDs 140 from being directly transferred to the image sensor 120, so as to maintain accuracy of the sensing.

Referring to FIG. 1A, in detail, the supporting structure 150 has a bottom end 152 and a top end 154 opposite to each other, the bottom end 152 is connected to the substrate 110, and top end 154 is connected to the optical layer 130. The substrate 110, the supporting structure 150 and the optical layer 130 form a containing space, the image sensor 120 is located inside the containing space, and the IR LEDs 140 are located outside the containing space.

In addition, the biometric device 100 further includes a light guiding structure 160. The light guiding structure 160 is, for example, a molding compound. The light guiding structure 160 is disposed on the substrate 110 and encapsulates the IR LEDs 140. The light guiding structure 160 has a reflecting surface 162, the IR LEDs 140 are located between the reflecting surface 162 and the supporting structure 150, and a distance between the reflecting surface 162 and a side surface 150a of the supporting structure 150 is gradually increased along a direction Z away from the substrate 110, wherein the side surface 150a is perpendicular to a top surface 110a of the substrate 110 on which the IR LEDs 140 are disposed. That is, the reflecting surface 162 is inclined relative to the top surface 110a of the substrate 110. Thus, the reflecting surface 162 is adapted to reflect the sensing light L toward the biological body 10. Moreover, the side surface 150a of the supporting structure 150 has a reflecting layer 156 thereon, and the reflecting layer 156 faces the IR LEDs 140 for reflecting the sensing light L toward the reflecting surface 162, so as to increase light utilization of the biometric device 100.

In the embodiment, the reflecting surface 162 of the light guiding structure 160 is, for example, a plane surface. In other embodiments, the reflecting surface of the light guiding structure can be a curved surface, such as a paraboloid, and the disclosure is not limited thereto.

Figure 3:
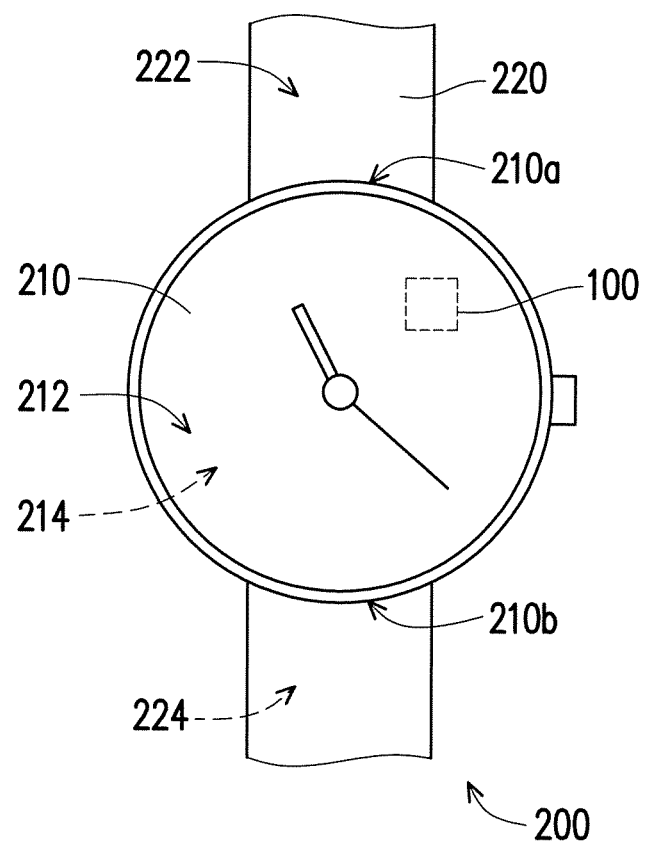
FIG. 3 is a schematic diagram of a wearable carrier according to an embodiment of the disclosure.

FIG. 3 is a schematic diagram of a wearable carrier according to an embodiment of the disclosure. Referring to FIG. 3, the wearable carrier 200 of the present embodiment is adapted to be worn on a user. The wearable carrier 200 includes a display unit 210, a strip unit 220 and the aforementioned biometric device 100. As shown in FIG. 3, the wearable carrier 200 is embodied by a watch, though the disclosure is not limited thereto. In other embodiments that are not shown, a sport bracelet or other types of wearable carrier is also applicable.

In detail, the display unit 210 of the present embodiment may, for example, display time information, where the display unit 210 has a first edge 210a and a second edge 210b opposite to each other and a display surface 212 and a back surface 214 opposite to each other. The strip unit 220 is connected to the first edge 210a and the second edge 210b of the display unit 210, and is adapted to be fixed on a wrist of the user, though the disclosure is not limited thereto. The biometric device 100 can be configured on the display surface 212 of the display unit 210. Certainly, in other embodiments that are not shown, the biometric device 100 can also be disposed on the back surface 214 of the display unit 210, or on an outer surface 222 of the strip unit 220, or on an inner surface 224 of the strip unit 220.

Since the biometric device 100 adopts the optical layer 130 to replace the conventional optical module consisting of multilayer of lenses, the surface of the optical layer is similar to a planar optical layer, such that the biometric device 100 of the present embodiment have an advantage of thinning tendency. When the biometric device 100 is integrated with the wearable device to form a wearable carrier 200, besides that the wearable carrier 200 has the original functions (for example, a time display function), it also has a biometric function, which satisfies user's appeal for multi-function on products.

According to actual requirements, technicians of the field may add other types of sensing elements in the biometric device 100 of the aforementioned embodiment, such that the functions of the biometric device can be more comprehensive and diversified. The added sensing elements are, for example, used for sensing the biological body, sensing an environment in which the biological body is located or providing other sensing functions, which is not limited by the disclosure.

In summary, since the biometric device of the embodiment of the disclosure adopts the design of the optical layer to replace the conventional optical module with a large volume, and the surface of the optical layer is similar to a planar optical layer, the biometric device of the disclosure has an advantage of thinning tendency. Moreover, the supporting structure disposed between the IR LED and the image sensor can prevent sensing light emitted by the IR LED from being directly transferred to the image sensor, so as to maintain accuracy of the sensing.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A biometric device, comprising:
   a substrate;
   an image sensor, disposed on the substrate;
   at least one infrared light emitting diode, disposed on the substrate;
   a supporting structure, disposed on the substrate and located between the image sensor and the at least one infrared light emitting diode; and
   an optical layer, disposed on the supporting structure, covering the image sensor, and comprising a coded pattern, wherein the supporting structure has a bottom end and a top end opposite to each other, the bottom end is connected to the substrate, and the top end is connected to the optical layer.

2. The biometric device as claimed in claim 1, wherein the supporting structure surrounds the image sensor.

3. The biometric device as claimed in claim 1, wherein an amount of the at least one infrared light emitting diode is plural, and the infrared light emitting diodes surround the supporting structure.

4. The biometric device as claimed in claim 1, wherein the substrate, the supporting structure and the optical layer form a containing space, the image sensor is located inside the containing space, and the at least one infrared light emitting diode is located outside the containing space.

5. The biometric device as claimed in claim 1, wherein the supporting structure has a reflecting layer thereon, and the reflecting layer faces the at least one infrared light emitting diode.

6. The biometric device as claimed in claim 1, comprising a light guiding structure, wherein the light guiding structure is disposed on the substrate and encapsulates the at least one infrared light emitting diode.

7. The biometric device as claimed in claim 6, wherein the light guiding structure has a reflecting surface, the at least one infrared light emitting diode is located between the reflecting surface and the supporting structure.

8. The biometric device as claimed in claim 7, wherein the at least one infrared light emitting diode is disposed on a top surface of the substrate, and the reflecting surface is inclined relative to the top surface of the substrate.

9. The biometric device as claimed in claim 7, wherein a distance between the reflecting surface and the supporting structure is gradually increased along a direction away from the substrate.

10. The biometric device as claimed in claim 1, wherein the image sensor comprises a plurality of photosensing units, and the photosensing units are arranged in an array.

11. The biometric device as claimed in claim 1, wherein the optical layer further comprises a transparent substrate, and the coded pattern is disposed on the transparent substrate to define a plurality of slits.

12. A wearable carrier, adapted to be worn on a user, the wearable carrier comprises:
   a display unit,
   a strip unit, connected to the display unit at a first edge and a second edge opposite to each other; and
   a biometric device as claimed in claim 1, disposed on the display unit or the strip unit for recognizing a biological characteristic of a region of a biological body.

13. The wearable carrier as claimed in claim 12, wherein the biometric device is located on a display surface of the display unit, a back surface of the display unit opposite to the display surface, an outer surface of the strip unit or an inner surface of the strip unit opposite to the outer surface.

* * * * *